US012809248B2

(12) United States Patent
Kosaka et al.

(10) Patent No.: US 12,809,248 B2
(45) Date of Patent: Nov. 24, 2026

(54) STEREOSCOPIC OPTICAL SYSTEM AND IMAGE PICKUP APPARATUS

(71) Applicant: CANON KABUSHIKI KAISHA, Tokyo (JP)

(72) Inventors: Yuichi Kosaka, Tochigi (JP); Akira Mizuma, Saitama (JP); Fumihiro Shinobu, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 268 days.

(21) Appl. No.: 18/882,796

(22) Filed: Sep. 12, 2024

(65) Prior Publication Data

US 2025/0093761 A1 Mar. 20, 2025

(30) Foreign Application Priority Data

Sep. 19, 2023 (JP) ................................ 2023-151614

(51) Int. Cl.
*G03B 35/10* (2021.01)
*G03B 35/08* (2021.01)

(52) U.S. Cl.
CPC ............ *G03B 35/10* (2013.01); *G03B 35/08* (2013.01)

(58) Field of Classification Search
None
See application file for complete search history.

(56) References Cited

U.S. PATENT DOCUMENTS

| | | | |
|---|---|---|---|
| 10,917,554 | B2 | 2/2021 | Kosaka |
| 11,543,734 | B2 | 1/2023 | Shinobu |
| 11,640,048 | B2 | 5/2023 | Mizuma |
| 11,860,510 | B2 | 1/2024 | Shinobu |
| 2012/0011323 | A1 | 1/2012 | Byun |
| 2020/0014908 | A1 | 1/2020 | Ebe |
| 2020/0174341 | A1 | 6/2020 | Shinobu |
| 2021/0231931 | A1 | 7/2021 | Mizuma |
| 2022/0214530 | A1 | 7/2022 | Mizuma |
| 2022/0221688 | A1 | 7/2022 | Yokoyama |
| 2023/0114678 | A1 | 4/2023 | Shinobu |
| 2023/0152559 | A1 | 5/2023 | Sugiyama |
| 2023/0350195 | A1 | 11/2023 | Mizuma |
| 2024/0012221 | A1 | 1/2024 | Mizuma |
| 2025/0067965 | A1 | 2/2025 | Mizuma |
| 2025/0102897 | A1 | 3/2025 | Shinobu |

FOREIGN PATENT DOCUMENTS

| | | | |
|---|---|---|---|
| JP | 2012-003022 | A | 1/2012 |
| JP | 2020-008629 | A | 1/2020 |
| JP | 2022-108802 | A | 7/2022 |
| JP | 2022-134346 | A | 9/2022 |
| JP | 2023-057913 | A | 4/2023 |

OTHER PUBLICATIONS

Office Action issued in corresponding GB Patent Application No. GB2413585.7, dated Feb. 17, 2025, pp. 1-8.

Office Action issued in corresponding Indian Patent Application No. 202444069835, dated Jun. 19, 2026, with English translation.

*Primary Examiner* — Derek S. Chapel

(74) *Attorney, Agent, or Firm* — Carter, DeLuca & Farrell LLP

(57) ABSTRACT

A stereoscopic optical system includes two optical systems arranged in parallel. Each of the two optical systems includes, in order from an object side to an image side, a front group, an aperture stop, and a rear group. Predetermined inequalities are satisfied.

14 Claims, 11 Drawing Sheets

STEREOSCOPIC OPTICAL SYSTEM AND IMAGE PICKUP APPARATUS

BACKGROUND

Technical Field

One of the aspects of the embodiments relates to a stereoscopic optical system for three-dimensional imaging, and an image pickup apparatus.

Description of Related Art

Stereoscopic optical systems which can provide stereoscopically viewable images for virtual reality (VR) and other applications are in demand. Japanese Patent Laid-Open No. 2020-008629 discloses a stereoscopic optical system that includes two optical systems arranged in parallel and each having a reflective surface configured to bend the optical path. In this stereoscopic optical system, a distance between the optical axes on the image side is reduced while a distance between the optical axes on the object side (baseline length) is secured. Moreover, this stereoscopic optical system can provide stereoscopic imaging with a single image sensor. Japanese Patent Laid-Open No. 2012-003022 discloses a small stereoscopic optical system that includes two optical systems arranged in parallel, and having axes extending straight from the object side to the image side.

SUMMARY

A stereoscopic optical system according to one aspect of the disclosure includes two optical systems arranged in parallel. Each of the two optical systems includes, in order from an object side to an image side, a front group, an aperture stop, and a rear group. The following inequalities are satisfied:

$$0.00 < (Din/L) \times F \leq 1.35$$

$$4.4 \leq (f \times f1 + f \times f2 - f1 \times f2)/f^2 \leq 10.0$$

where L is a distance on an optical axis from a lens surface closest to an object in each of the two optical systems to an image plane, Din is a distance between the optical axes of lenses closest to the object in the two optical systems, F is an F-number of each of the two optical systems, f is a focal length of each of the two optical systems, f1 is a focal length of the front group in each of the two optical systems, and f2 is a focal length of the rear group in each of the two optical systems. A stereoscopic optical system according to another aspect of the disclosure includes two optical systems arranged in parallel. Each of the two optical systems includes, in order from an object side to an image side, a front group, an aperture stop, and a rear group. The following inequalities are satisfied:

$$0.4 \leq (Lb/Din)/F \leq 1.5$$

$$4.4 \leq (f \times f1 + f \times f2 - f1 \times f2)/f^2 \leq 10.0$$

where Lb is a distance on an optical axis from the aperture stop to an image plane in each of the two optical systems, Din is a distance between optical axes of lenses closest to an object in the two optical systems, F is an F-number of each of the two optical systems, f is a focal length of each of the two optical systems, f1 is a focal length of the front group in each of the two optical systems, and f2 is a focal length of the rear group in each of the two optical systems. An image pickup apparatus having one of the above stereoscopic optical systems also constitutes another aspect of the disclosure.

Further features of various embodiments of the disclosure will become apparent from the following description of embodiments with reference to the attached drawings.

DESCRIPTION OF THE EMBODIMENTS

Figure 1A:
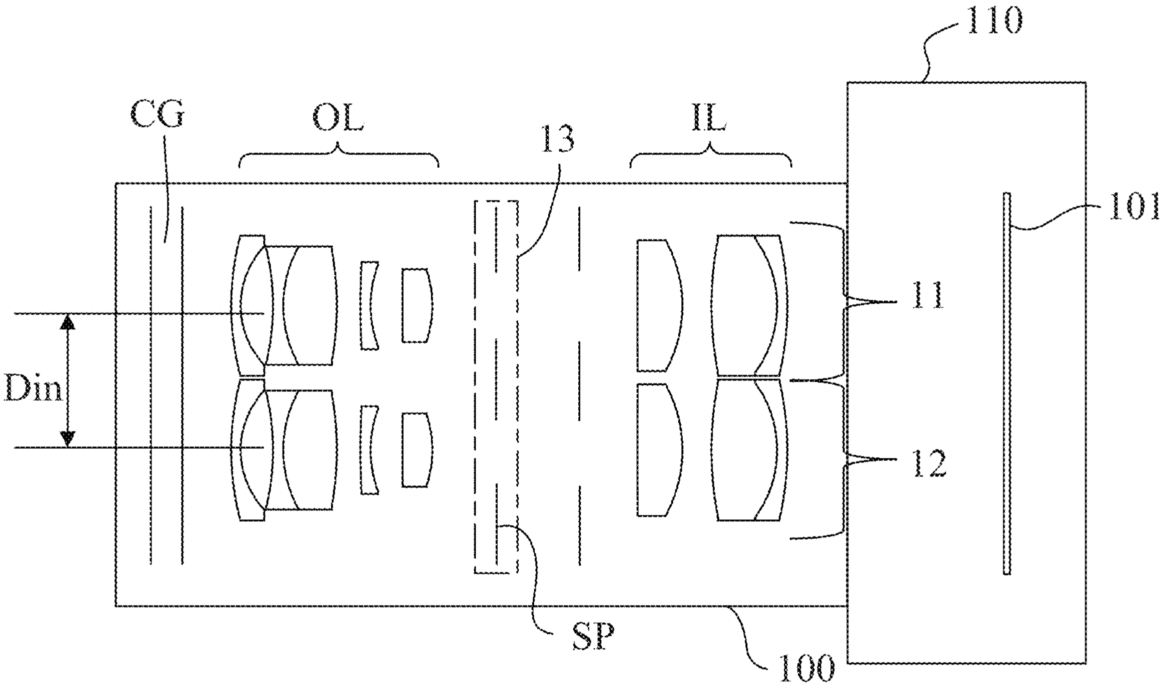
FIGS. 1A and 1B are sectional views of a lens apparatus and stereoscopic optical system according to Example 1.
Figure 1B:
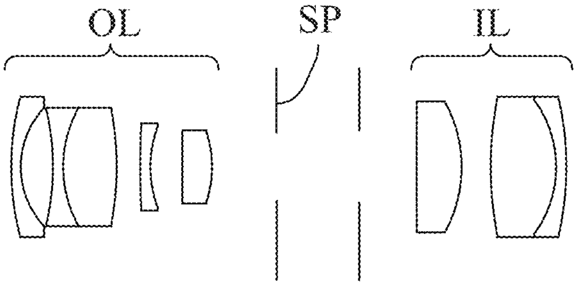
Figure 2:
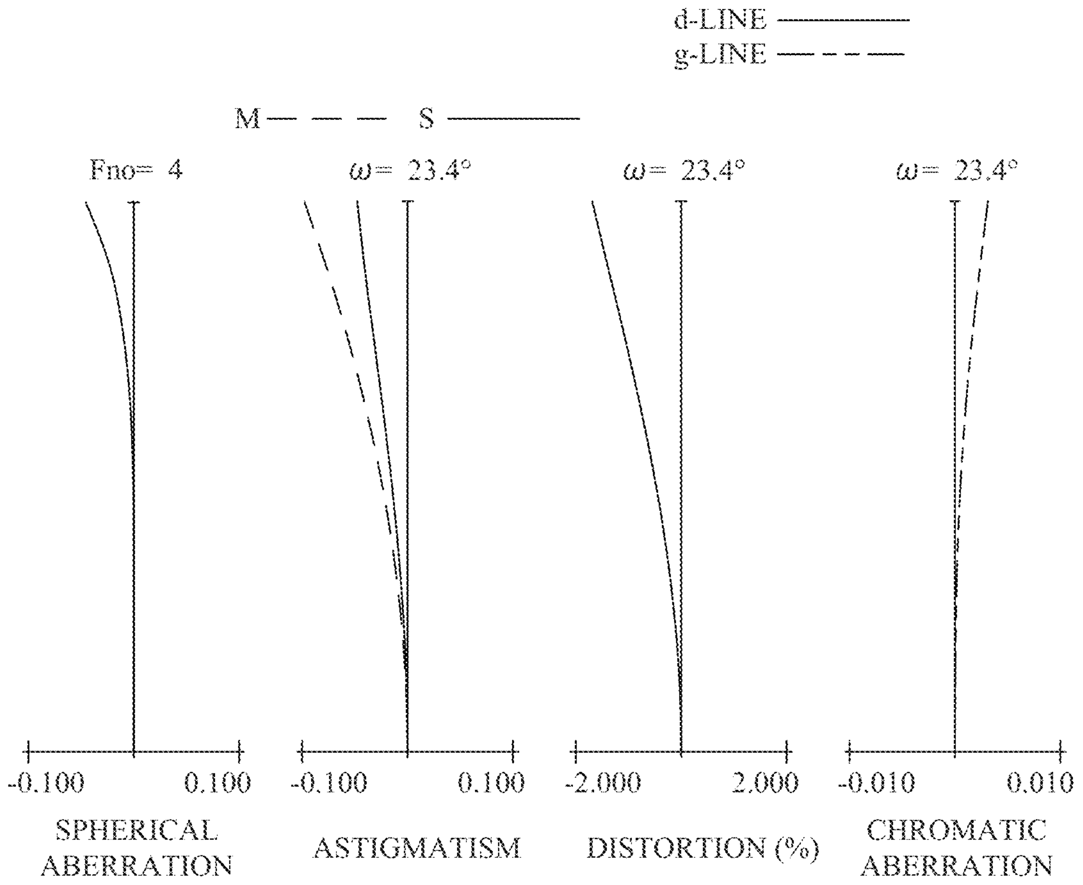
FIG. 2 is an aberration diagram of the stereoscopic optical system according to Example 1.
Figure 3A:
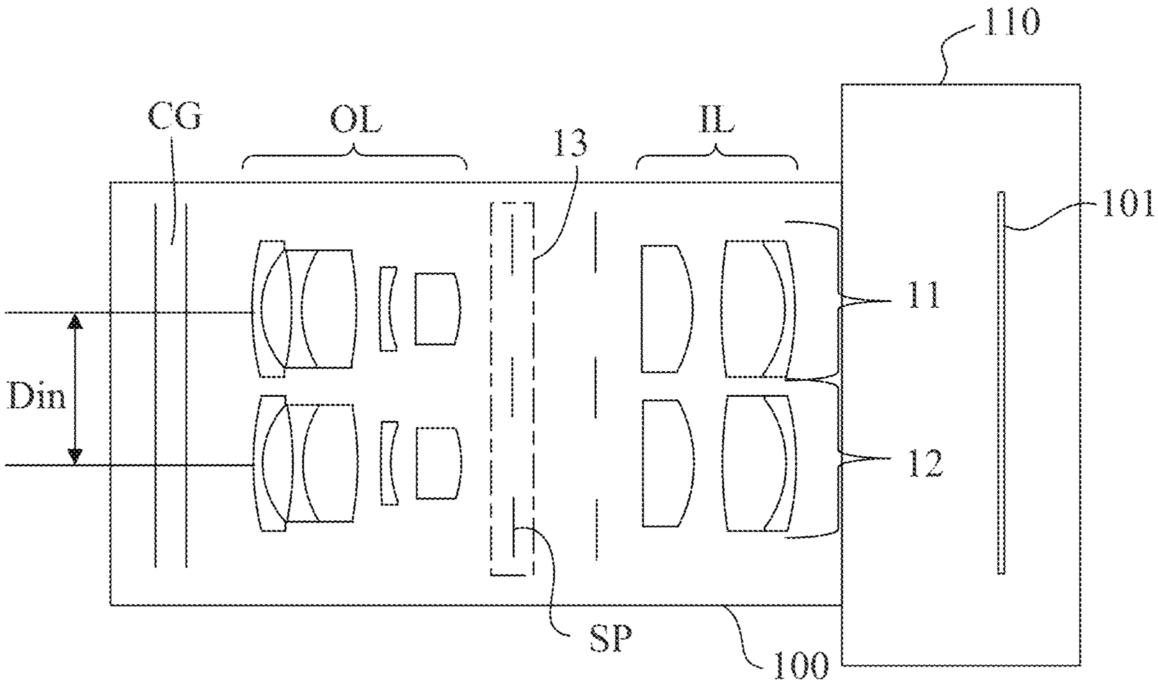
FIGS. 3A and 3B are sectional views of a lens apparatus and stereoscopic optical system according to Example 2.
Figure 3B:
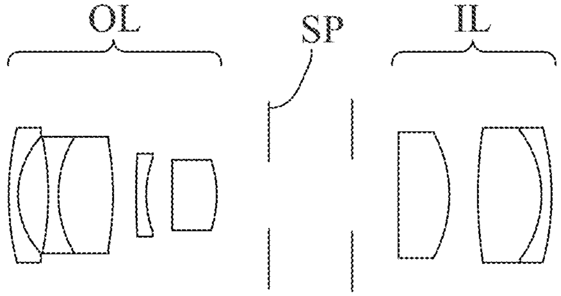
Figure 4:
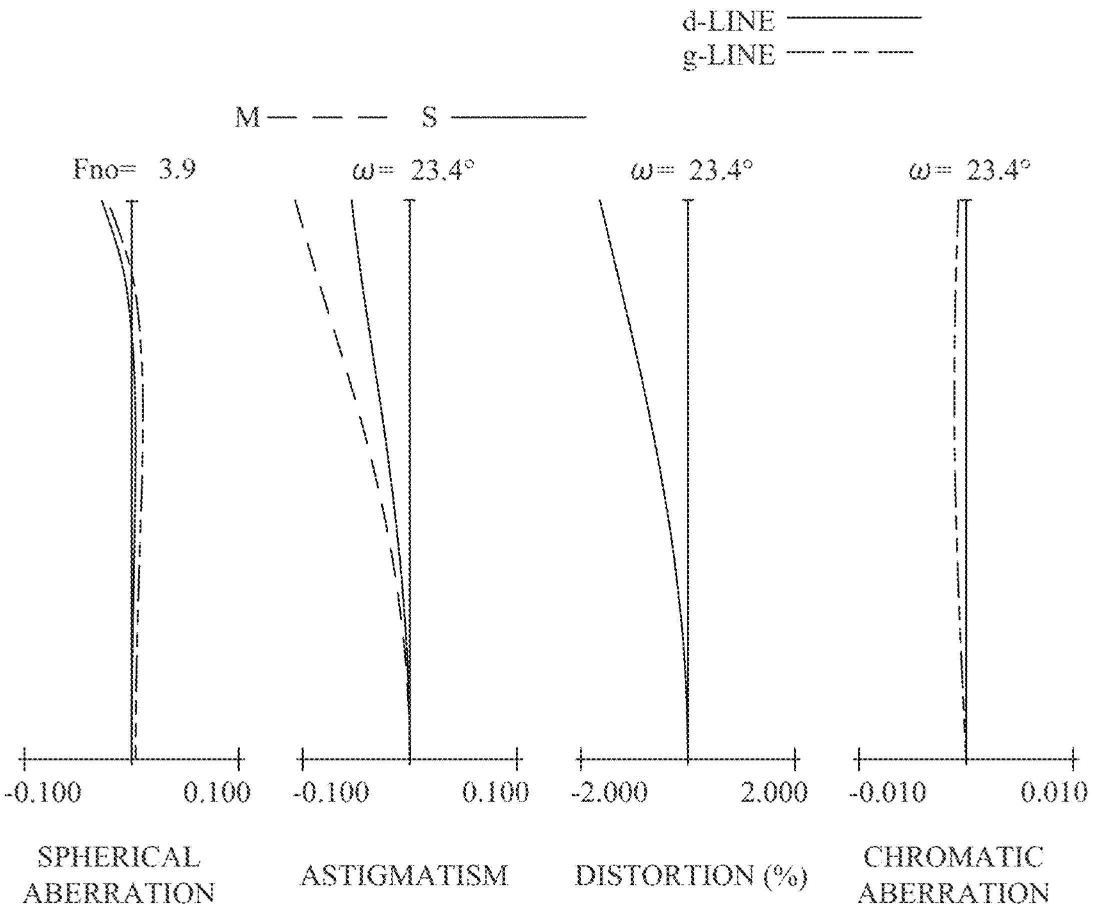
FIG. 4 is an aberration diagram of the stereoscopic optical system according to Example 2.
Figure 5A:
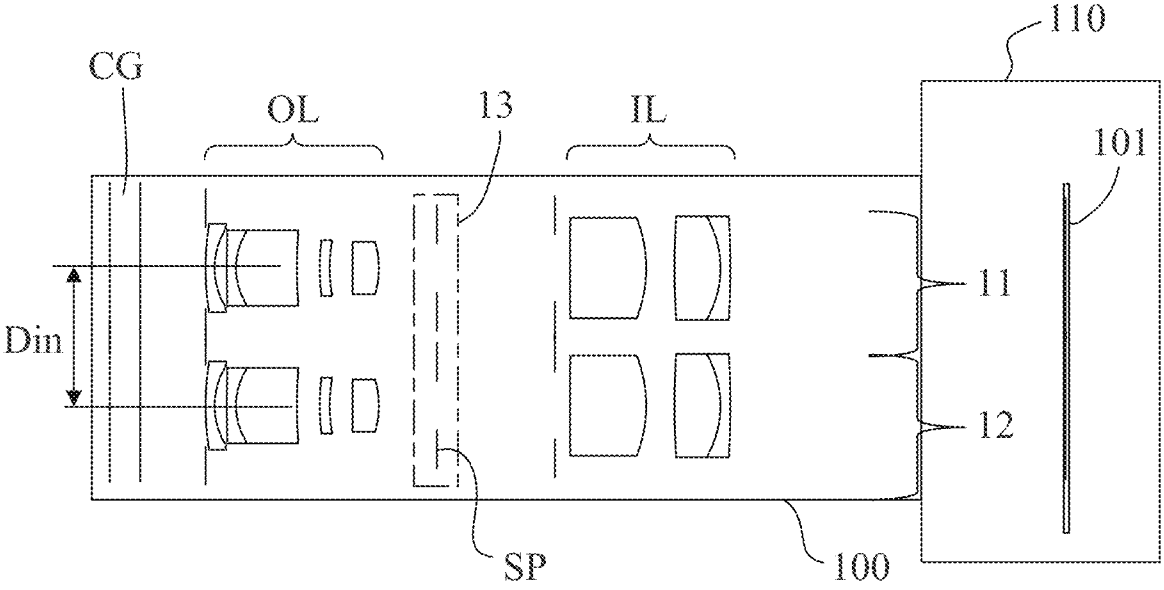
FIGS. 5A and 5B are sectional views of a lens apparatus and stereoscopic optical system according to Example 3.
Figure 5B:
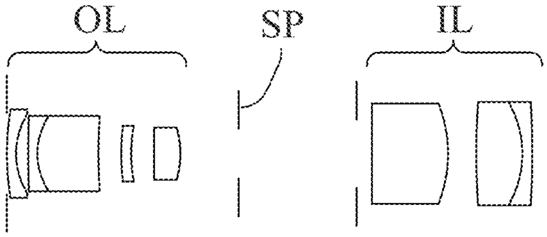
Figure 6:
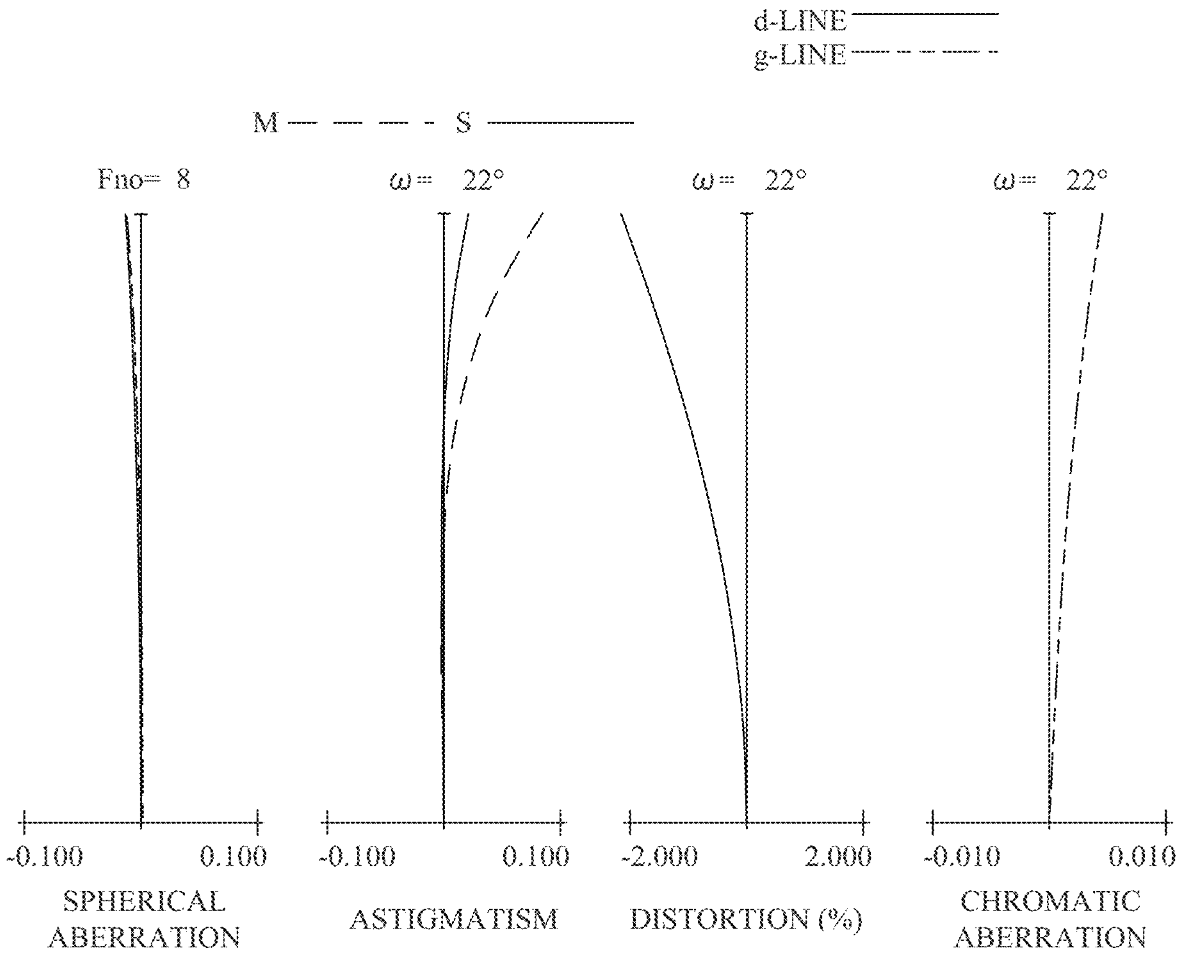
FIG. 6 is an aberration diagram of the stereoscopic optical system according to Example 3.
Figure 7A:
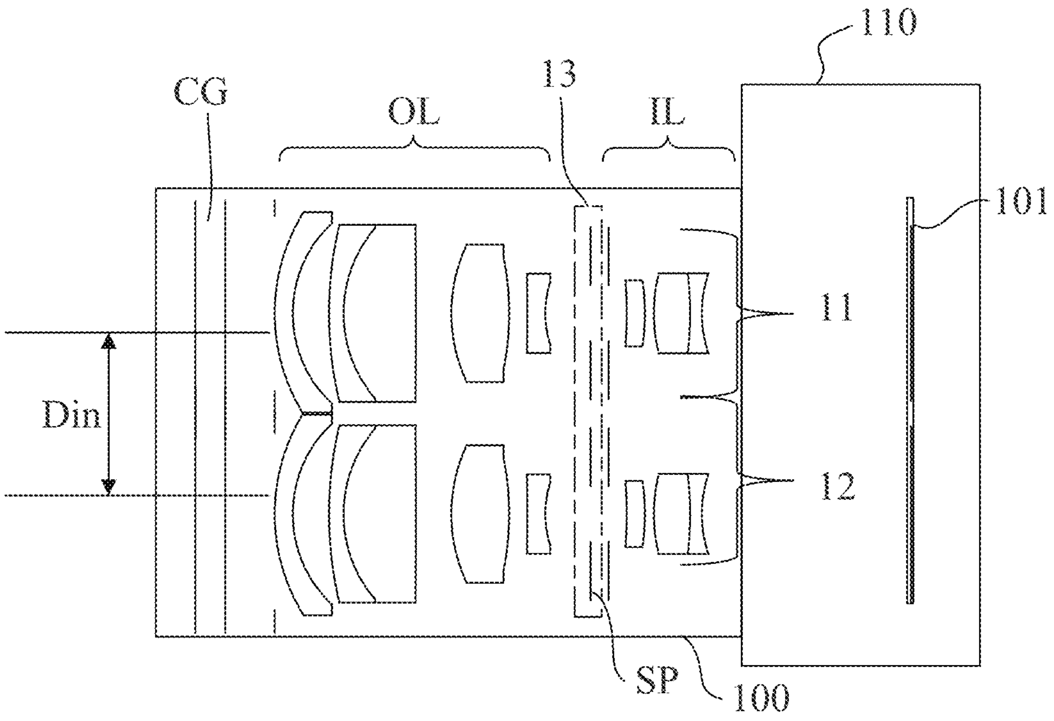
FIGS. 7A and 7B are sectional views of a lens apparatus and stereoscopic optical system according to Example 4.
Figure 7B:
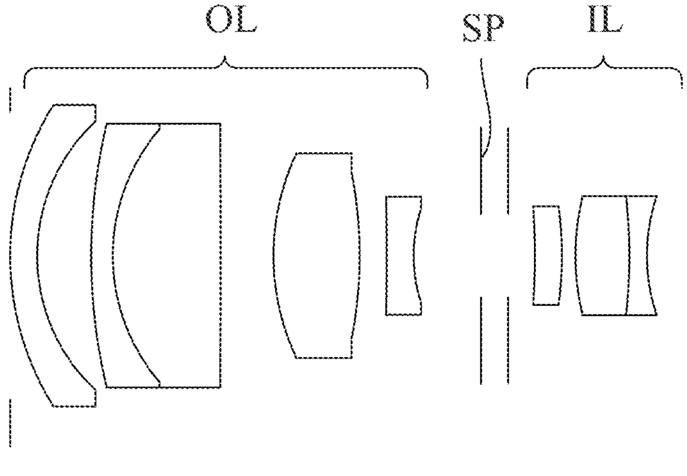
Figure 8:
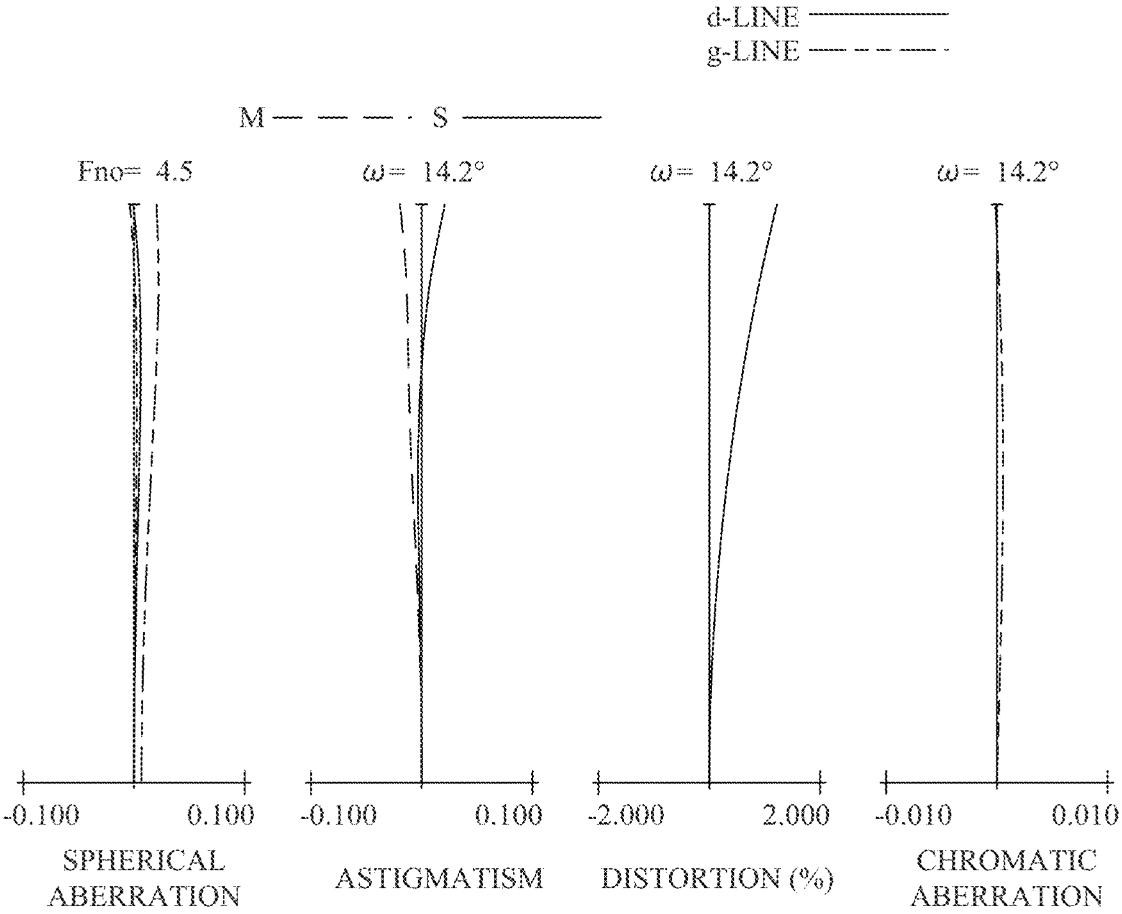
FIG. 8 is an aberration diagram of the stereoscopic optical system according to Example 4.
Figure 9A:
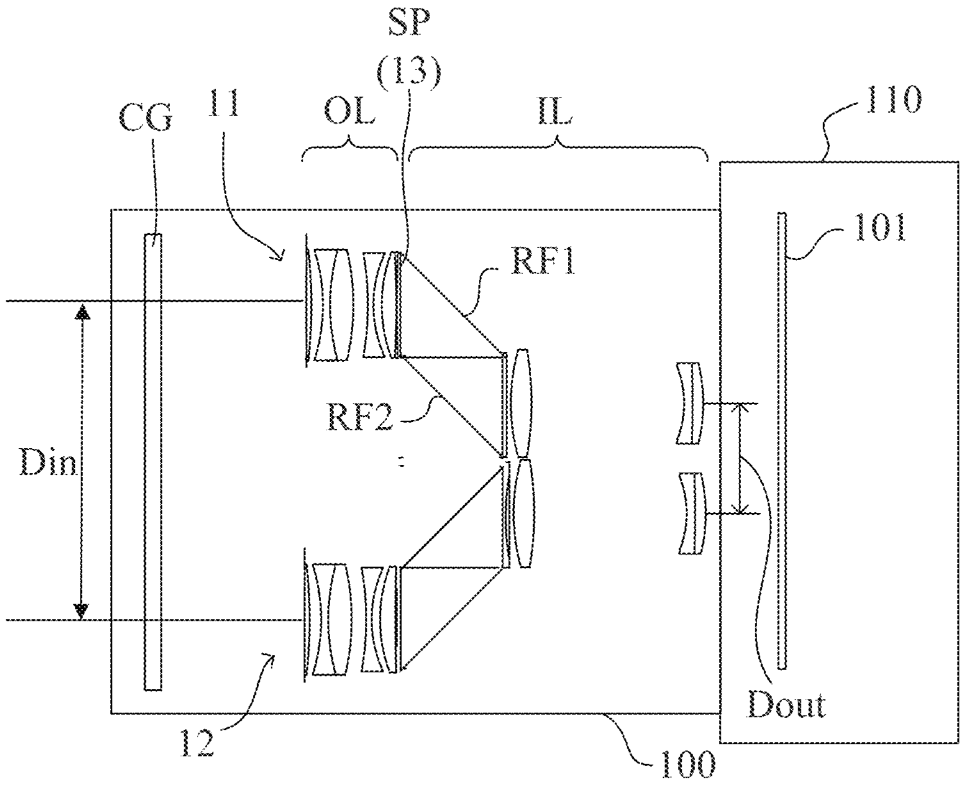
FIGS. 9A and 9B are sectional views of a lens apparatus and stereoscopic optical system according to Example 5.
Figure 9B:
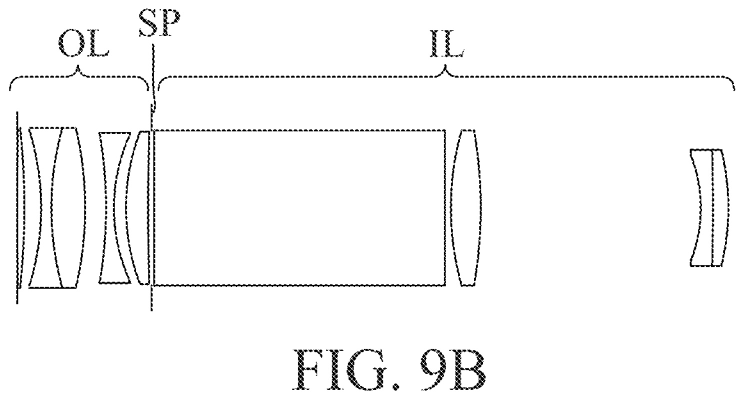
Figure 10:
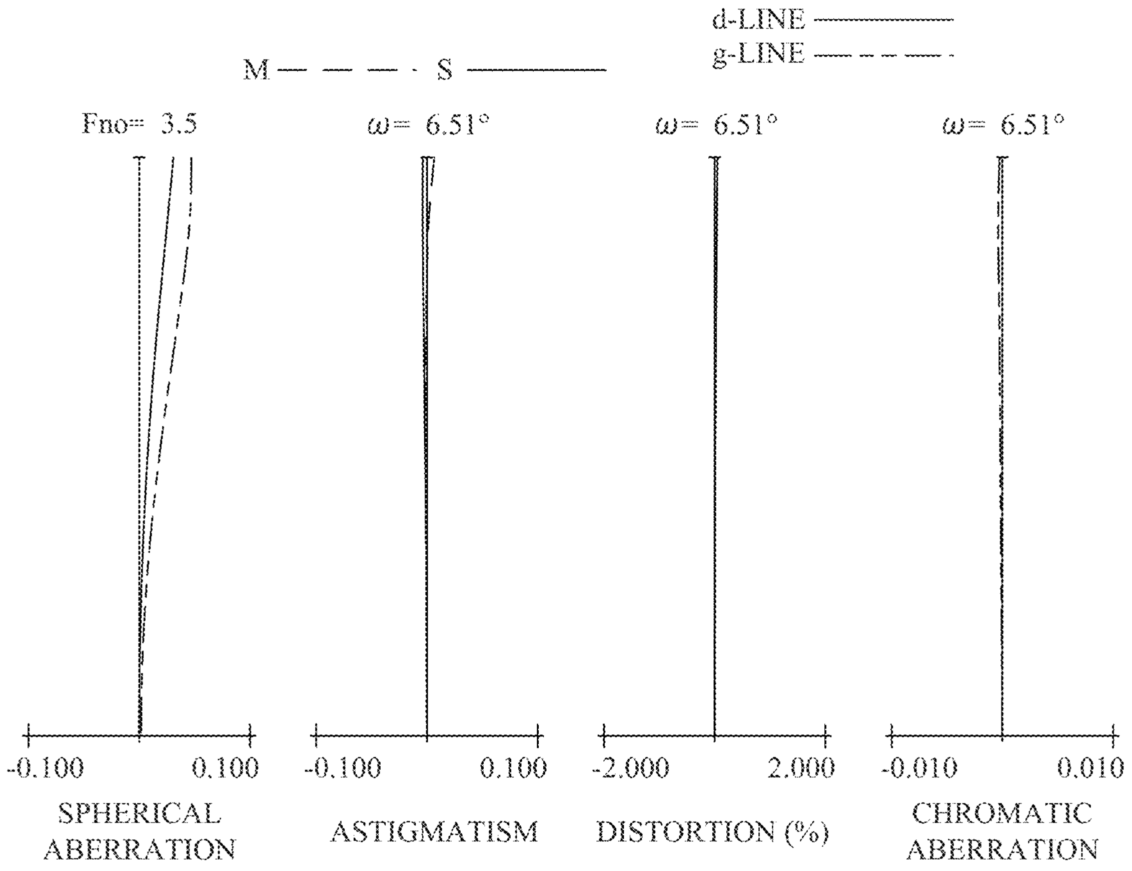
FIG. 10 is an aberration diagram of the stereoscopic optical system according to Example 5.

Referring now to the accompanying drawings, a description will be given of examples according to the disclosure.

FIGS. 1A, 3A, 5A, 7A, and 9A illustrate sections of lens apparatuses 100 having stereoscopic optical systems according to Examples 1 to 5 viewed from the top. Each drawing also illustrates a section of an image pickup apparatus 110 to which the lens apparatus 100 as an interchangeable lens is detachably attached. The image pickup apparatus 110 includes a digital video camera, a digital still camera, a broadcasting camera, a surveillance camera, and a film-based camera. The image pickup apparatus 110 may also be a camera for a mobile terminal such as a smartphone or a tablet. FIGS. 1B, 3B, 5B, 7B, and 9B illustrate sections of one of the stereoscopic optical systems according to Examples 1 to 5.

In each of the drawings, a left side is an object side, and a right side is an image side. In FIGS. 1A, 3A, 5A, 7A, and 9A, an upper side is a right side and a lower side is a left side in the horizontal direction.

In Examples 1 to 5, the lens apparatus 100 holds two optical systems 11 and 12 arranged in parallel on the left and right sides in a housing. The optical systems 11 and 12 have the same configuration, and form optical images (right object image and left object image) on the same imaging surface of a single image sensor 101. Alternatively, each of the optical systems 11 and 12 may form an optical image on an imaging surface of a different image sensor.

SP represents an aperture stop. Each optical system includes an object-side lens unit OL disposed on the object side of the aperture stop SP, and an image-side lens unit IL disposed on the image side of the aperture stop SP.

Simultaneously moving the entire optical systems 11 and 12 in the optical axis direction by unillustrated actuators can form optical images that are always in in-focus states on the same surface. CG in FIGS. 1A, 3A, 5A, 7A, and 9A represents a cover glass made of a parallel plate (i.e., having no refractive power) disposed to cover a lens surface closest to an object that has refractive power in each optical system.

Din is a base length, which is a distance between the optical axes of lenses having refractive powers that are located closest to the object in the optical systems 11 and 12. Each of the optical systems in Examples 1 to 4 is a coaxial optical system having an optical axis extending straight from the object side to the image side. Therefore, a distance between the centers of the right and left object images formed on the image sensor 101 is also Din.

Each of the optical systems in Example 5 has a configuration in which the optical axis is bent by two reflective surfaces RF1 and RF2 disposed in the image-side lens unit IL. Therefore, a distance Dout between the optical axes of the lenses closest to the image plane, that is, a distance between the centers of the right and left object images formed on the image sensor 101 is shorter than the base length Din on the object side.

In each example, a single diaphragm mechanism 13 is provided for each of the optical systems 11 and 12, and aperture diameters in the aperture stops SP in both optical systems 11 and 12 are simultaneously changed. Thereby, the size of the lens apparatus can be reduced.

Figure 11:
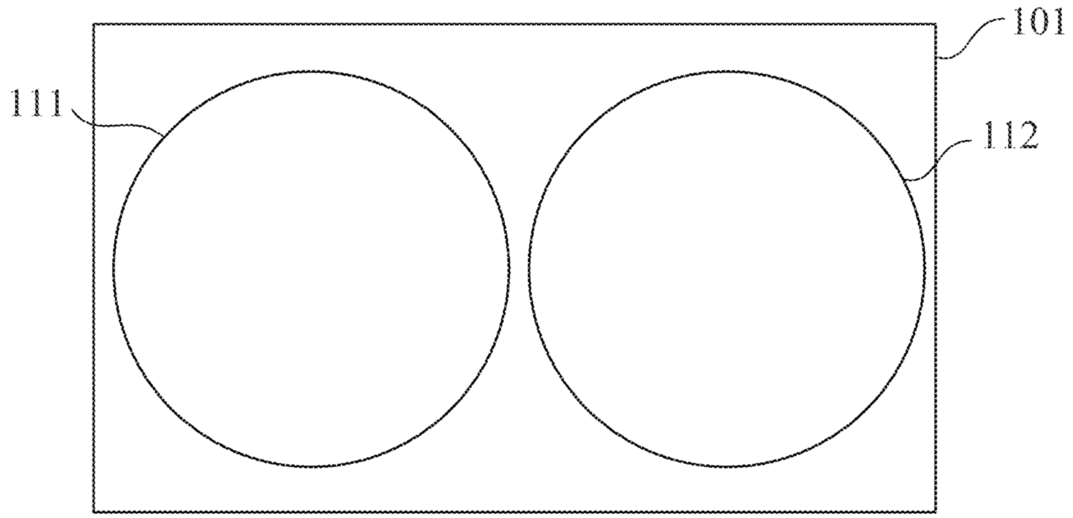
FIG. 11 illustrates optical images formed on an image sensor in each example.

FIG. 11 illustrates right and left object images (image circles) 111 and 112 formed on the imaging surface of the image sensor 101 by the stereoscopic optical system according to each example. The right object image 111 is formed in half of the area on the right side (although it is on the left side in FIG. 11) in the longitudinal direction of the imaging surface, and the left object image 112 is formed in half of the area on the left side (although it is on the right side in FIG. 11). Photoelectrically converting (capturing) these two object images using the image sensor 101 can provide two captured images (i.e., an image for the right eye and an image for the left eye) that have parallax and are stereoscopically viewable. These right-eye and left-eye images are displayed on a display element such as a liquid crystal panel or an organic EL panel in a stereoscopic display apparatus such as VR goggles, and the observer can recognize a three-dimensional image by viewing the right-eye image with the right eye and the left-eye image with the left eye, respectively.

Each stereoscopic optical system of the above example configuration satisfies the following inequality (1):

$$0 < (Din/L) \times F \leq 1.35 \tag{1}$$

where L is an overall optical length of each optical system (a distance on the optical axis from a lens surface closest to an object to the image plane), Din is a base length, and F is an F-number of each optical system.

Inequality (1) defines a proper relationship among the overall optical length, base length, and F-number to provide a stereoscopic optical system with a reduced size and excellent optical performance for three-dimensional imaging. In a case where the F-number increases (becomes dark) so that (Din/L)×F becomes higher than the upper limit of inequality (1), each optical system will become pan-focused, and the optical performance for three-dimensional imaging deteriorate. In a case where the base length increases so that (Din/L)×F becomes higher than the upper limit of inequality (1), the size of the stereoscopic optical system increases.

Inequality (1) may be replaced with inequality (1a) below:

$$0.00 < (Din/L) \times F \leq 1.33 \tag{1a}$$

Inequality (1) may be replaced with inequality (1b) below:

$$0.00 < (Din/L) \times F \leq 1.30 \tag{1b}$$

Inequality (1) may be replaced with inequality (1c) below:

$$0 < (Din/L) \times F \leq 1.0 \tag{1c}$$

The stereoscopic optical system according to each example satisfies at least one of the following inequalities (2) to (5):

$$0.4 \leq (Lb/Din)/F \leq 1.5 \tag{2}$$

$$0.2 \leq \Phi/Din \leq 0.8 \tag{3}$$

$$0.2 \leq (f/F)/hgt \leq 4.0 \tag{4}$$

$$4.0 \leq (f \times f1 + f \times f2 - f1 \times f2)/f^2 \leq 10.0 \tag{5}$$

In inequalities (2) to (5), Lb is a distance on the optical axis from the aperture stop SP to the image plane, and Φ is an aperture diameter of the aperture stop SP when it is fully open (maximum aperture diameter). f is a focal length of each optical system (11, 12), and hgt is a radius of an optical image (111, 112) formed on the image plane by each optical system, i.e., an image circle radius. f1 is a focal length of a portion of each optical system disposed on the object side of the aperture stop SP (object-side lens unit OL), and f2 is a focal length of a portion of each optical system disposed on the image side of the aperture stop SP (image-side lens unit IL).

Inequality (2) defines a proper relationship among the distance on the optical axis from the aperture stop SP to the image plane, the base length, and the F-number to provide a stereoscopic optical system with a reduced size and excellent optical performance for three-dimensional imaging. In a case where the F-number increases (becomes dark) so that (Lb/Din)/F becomes lower than below the lower limit of inequality (2), the diffraction limit frequency lowers and satisfactory optical performance cannot be obtained. In a case where the F-number reduces so that (Lb/Din)/F becomes higher than the upper limit of inequality (2), the size of the stereoscopic optical system increases.

Inequality (3) defines a proper relationship among the maximum aperture diameter and base length to provide a stereoscopic optical system with a reduced size and excellent optical performance for three-dimensional imaging. In a case where the aperture diameter reduces (becomes dark) so that Φ/Din becomes lower than the lower limit of inequality (3), the diffraction limit frequency lowers and satisfactory optical performance cannot be obtained. In a case where the aperture diameter increases so that Φ/Din becomes higher than the upper limit of inequality (3), the size of the stereoscopic optical system increases.

Inequality (4) defines a proper relationship among the focal length, F-number, and image circle radius of the entire system of each optical system to provide a stereoscopic optical system with a reduced size and excellent optical performance for three-dimensional imaging. In a case where the F-number increases (becomes dark) so that (f/F)/hgt becomes lower than the lower limit of inequality (4), the diffraction limit frequency lowers and satisfactory optical performance cannot be obtained. In a case where the F-number reduces so that (f/F)/hgt becomes higher than the upper limit of inequality (4), the size of the stereoscopic optical system increases.

Inequality (5) illustrates a proper relationship among the focal length of each optical system, the focal length of the object-side portion, and the focal length of the image-side portion to provide a stereoscopic optical system with a reduced size and reduced color shading. In a case where this inequality is satisfied, that is, in a case where the lengths before and after the aperture stop SP increase and the exit pupil distance increases, the lens diameter of each optical system can be reduced. In a case where $(f\times f1+f\times f2-f1\times f2)/f^2$ becomes lower than the lower limit of inequality (5), the exit pupil distance reduces and color shading occurs. In a case where $(f\times f1+f\times f2-f1\times f2)/f^2$ becomes higher than the upper limit of inequality (5), the diameter of the lens disposed closest to the image plane in each optical system increases.

Inequalities (2) to (5) may be replaced with inequalities (2a) to (5a) below:

$$0.42 \le (Lb/Din)/F \le 1.00 \quad (2a)$$

$$0.22 \le \Phi/Din \le 0.60 \quad (3a)$$

$$0.22 \le (f/F)/hgt \le 3.00 \quad (4a)$$

$$4.4 \le (f\times f1+f\times f2-f1\times f2)/f^2 \le 9.0 \quad (5a)$$

Inequalities (2) to (5) may be replaced with inequalities (2b) to (5b) below:

$$0.45 \le Lb/Din/F \le 0.80 \quad (2b)$$

$$0.24 \le \Phi/Din \le 0.50 \quad (3b)$$

$$0.26 \le (f/F)/hgt \le 1.00 \quad (4b)$$

$$4.6 \le (f\times f1+f\times f2-f1\times f2)/f^2 \le 8.0 \quad (5b)$$

Inequalities (2) to (5) may be replaced with inequalities (2c) to (5c) below:

$$0.5 \le (Lb/Din)/F \le 0.6 \quad (2c)$$

$$0.3 \le \Phi/Din \le 0.4 \quad (3c)$$

$$0.28 \le (f/F)/hgt \le 0.50 \quad (4c)$$

$$5.0 \le (f\times f1+f\times f2-f1\times f2)/f^2 \le 7.6 \quad (5c)$$

Numerical examples 1 to 5 corresponding to Examples 1 to 5 will be illustrated below. In each numerical example, a surface number m indicates the order of a surface counted from the object side. r (mm) represents a radius of curvature of an m-th surface, and d (mm) represents a distance (air gap) on the optical axis between m-th and (m+1)th surfaces. nd represents a refractive index for the d-line of the optical material between m-th and (m+1)-th surfaces, and νd represents an Abbe number of the optical member based on the d-line. The Abbe number νd based on the d-line is expressed as follows:

$$\nu d=(Nd-1)/(NF-NC)$$

where Nd, NF, and NC are refractive indices for the d-line (587.6 nm), F-line (486.1 nm), and C-line (656.3 nm) in the Fraunhofer lines, respectively.

In each numerical example, all of d, focal length (mm), F-number (Fno), and half angle of view (°) are values in a case where the optical system according to each example is in an in-focus state on an object at infinity. A back focus (BF) is a distance on the optical axis from a final lens surface (a lens surface closest to the image plane) to an image plane. An overall lens length is a distance on the optical axis from a lens surface closest to an object (first surface) of the optical system to the final surface plus the back focus.

Table 1 illustrates the values related to the above-mentioned inequalities (1) to (5) in numerical examples 1 to 5.

FIGS. 2, 4, 6, 8, and 10 illustrate the longitudinal aberrations (spherical aberration, astigmatism, distortion, and chromatic aberration) of the optical systems according to Examples 1 to 5, respectively, in an in-focus state on an object at infinity. In the spherical aberration diagram, Fno indicates the F-number. A solid line indicates a spherical aberration amount for the d-line (wavelength 587.6 nm), and a dashed line indicates a spherical aberration amount for the g-line (wavelength 435.8 nm). In the astigmatism diagram, a solid line S indicates an astigmatism amount on a sagittal image plane, and a dashed line M indicates an astigmatism amount on a meridional image plane. The distortion diagram illustrates a distortion amount for the d-line. The chromatic aberration diagram illustrates a lateral chromatic aberration amount for the g-line. ω represents a half angle of view (°).

Numerical Example 1

Unit: mm

| SURFACE DATA | | | | |
|---|---|---|---|---|
| Surface No. | r | d | nd | νd |
| 1 | ∞ | 2.00 | 1.51633 | 64.1 |
| 2 | ∞ | 3.1 | | |
| 3 | 17.741 | 0.60 | 2.00069 | 25.5 |
| 4 | 5.568 | 2.06 | | |
| 5 | −15.843 | 0.65 | 1.49700 | 81.7 |
| 6 | 7.816 | 3.41 | 1.91082 | 35.2 |
| 7 | −20.000 | 1.50 | | |
| 8 | 52.224 | 0.65 | 1.90043 | 37.4 |
| 9 | 7.530 | 2.03 | | |
| 10 | 800.000 | 1.90 | 1.51742 | 52.4 |
| 11 | −7.167 | 4.09 | | |
| 12 (SP) | ∞ | 5.30 | | |
| 13 | ∞ | 3.67 | | |
| 14 | 800.000 | 2.86 | 1.48749 | 70.2 |
| 15 | −8.741 | 1.85 | | |

| | | | | |
|---|---|---|---|---|
| 16 | 22.795 | 4.18 | 1.49700 | 81.7 |
| 17 | −7.288 | 0.65 | 2.00100 | 29.1 |
| 18 | −19.868 | 14.00 | | |
| Image Plane | ∞ | | | |

| VARIOUS DATA ZOOM RATIO 1.00 | |
|---|---|
| Focal Length | 7.85 |
| Fno | 4.00 |
| Half Angle of View (°) | 23.39 |
| Image Height | 3.40 |
| Overall Lens Length | 54.50 |
| BF | 14.00 |

LENS UNIT DATA

| Lens Unit | Starting Surface | Focal Length |
|---|---|---|
| 1 | 1 | ∞ |
| 2 | 3 | −38.94 |
| 3 | 12 | 15.99 |

Numerical Example 2

Unit: mm

SURFACE DATA

| Surface No. | r | d | nd | vd |
|---|---|---|---|---|
| 1 | ∞ | 2.00 | 1.51633 | 64.1 |
| 2 | ∞ | 4.28 | | |
| 3 | 18.462 | 0.60 | 2.00069 | 25.5 |
| 4 | 5.606 | 1.97 | | |
| 5 | −18.975 | 0.65 | 1.49700 | 81.7 |
| 6 | 7.390 | 3.55 | 1.91082 | 35.2 |
| 7 | −20.000 | 1.50 | | |
| 8 | 48.467 | 0.65 | 1.90043 | 37.4 |
| 9 | 6.960 | 1.69 | | |
| 10 | 795.039 | 2.89 | 1.53172 | 48.8 |
| 11 | −7.309 | 3.38 | | |
| 12 (SP) | ∞ | 5.40 | | |
| 13 | ∞ | 3.00 | | |
| 14 | 795.039 | 3.31 | 1.48749 | 70.2 |
| 15 | −8.616 | 1.85 | | |
| 16 | 29.070 | 4.13 | 1.49700 | 81.7 |
| 17 | −6.974 | 0.65 | 2.00100 | 29.1 |
| 18 | −17.099 | 14.00 | | |
| Image Plane | ∞ | | | |

| VARIOUS DATA ZOOM RATIO 1.00 | |
|---|---|
| Focal length | 7.85 |
| Fno | 3.90 |
| Half Angle of View (°) | 23.39 |
| Image Height | 3.40 |
| Overall Lens Length | 55.50 |
| BF | 14.00 |

LENS UNIT DATA

| Lens Unit | Starting Surface | Focal Length |
|---|---|---|
| 1 | 1 | ∞ |
| 2 | 3 | −63.86 |
| 3 | 8 | −118.98 |
| 4 | 12 | ∞ |
| 5 | 14 | 17.51 |
| 6 | 16 | 199.86 |

Numerical Example 3

Unit: mm

SURFACE DATA

| Surface No. | r | d | nd | vd |
|---|---|---|---|---|
| 1 | ∞ | 2.00 | 1.51633 | 64.1 |
| 2 | ∞ | 4.29 | | |
| 3 | ∞ | 0.00 | | |
| 4 | 17.949 | 0.60 | 1.59522 | 67.7 |
| 5 | 4.961 | 0.80 | | |
| 6 | 80.199 | 0.60 | 1.74320 | 49.3 |
| 7 | 4.452 | 4.00 | 1.59551 | 39.2 |
| 8 | 30.092 | 1.50 | | |
| 9 | 15.763 | 0.65 | 1.78800 | 47.4 |
| 10 | 9.807 | 1.50 | | |
| 11 | 649.000 | 1.73 | 1.49700 | 81.5 |
| 12 | −6.114 | 3.81 | | |
| 13 (SP) | ∞ | 7.74 | | |
| 14 | ∞ | 1.00 | | |
| 15 | 728.740 | 5.00 | 1.49700 | 81.5 |
| 16 | −8.958 | 1.85 | | |
| 17 | 46.785 | 3.03 | 1.49700 | 81.5 |
| 18 | −6.743 | 0.65 | 1.78800 | 47.4 |
| 19 | −56.371 | 22.01 | | |
| Image Plane | ∞ | | | |

| VARIOUS DATA ZOOM RATIO 1.00 | | |
|---|---|---|
| Focal length | 12.00 | 12.00 |
| Fno | 8.00 | 8.00 |
| Half Angle of View(°) | 22.01 | 22.01 |
| Image Height | 4.85 | 4.85 |
| Overall Lens Length | 62.76 | 62.76 |
| BF | 22.01 | 22.01 |
| d2 | 4.29 | 4.29 |
| d12 | 3.81 | 3.81 |
| d14 | 1.00 | 1.00 |
| d19 | 22.01 | 22.01 |

Numerical Example 4

Unit: mm

SURFACE DATA

| Surface No. | r | d | nd | vd |
|---|---|---|---|---|
| 1 | ∞ | 1.65 | 1.51633 | 64.1 |
| 2 | ∞ | 3.29 | | |
| 3 | ∞ | 0.00 | | |
| 4 | 10.579 | 1.00 | 1.78636 | 47.1 |
| 5 | 6.853 | 2.01 | | |
| 6 | 21.216 | 0.80 | 1.91701 | 36.2 |
| 7 | 7.234 | 4.00 | 1.84684 | 32.7 |
| 8 | −525.533 | 1.96 | | |
| 9 | 8.910 | 3.20 | 1.59522 | 67.7 |
| 10 | −15.871 | 1.00 | | |
| 11 | −139.810 | 1.00 | 1.75521 | 25.4 |
| 12 | 5.739 | 2.50 | | |
| 13 (SP) | ∞ | 1.00 | | |
| 14 | ∞ | 1.00 | | |
| 15 | −22.569 | 1.00 | 2.00330 | 28.3 |
| 16 | −12.905 | 0.50 | | |
| 17 | 9.123 | 2.00 | 1.88300 | 40.8 |
| 18 | −18.973 | 0.65 | 1.63294 | 34.6 |
| 19 | 6.887 | 11.01 | | |
| Image Plane | ∞ | | | |

-continued

| VARIOUS DATA ZOOM RATIO 1.00 | |
|---|---|
| Focal Length | 19.10 |
| Fno | 4.50 |
| Half Angle of View (°) | 14.24 |
| Image Height | 4.85 |
| Overall Lens Length | 39.55 |
| BF | 11.01 |

Numerical Example 5

Unit: mm

SURFACE DATA

| Surface No. | r | d | nd | νd |
|---|---|---|---|---|
| 1 | ∞ | 2.00 | 1.51633 | 64.1 |
| 2 | ∞ | 17.26 | | |
| 3 | ∞ | 0.00 | | |
| 4 | 471.725 | 0.60 | 1.94594 | 18.0 |
| 5 | −60.033 | 1.38 | | |
| 6 | −21.701 | 0.85 | 1.61293 | 37.0 |
| 7 | 24.545 | 2.79 | 1.88300 | 40.8 |
| 8 | −28.231 | 1.73 | | |
| 9 | −35.328 | 0.65 | 1.71736 | 29.5 |
| 10 | 14.607 | 1.00 | | |
| 11 | 17.760 | 1.82 | 1.67000 | 57.3 |
| 12 | 188.195 | 0.50 | | |
| 13 (SP) | ∞ | 24.00 | 1.51633 | 64.1 |
| 14 | ∞ | 0.50 | | |
| 15 | 23.747 | 2.47 | 1.49700 | 81.5 |
| 16 | −36.775 | 18.17 | | |
| 17 | −11.886 | 1.00 | 1.85896 | 22.7 |
| 18 | −169.717 | 1.28 | 1.94594 | 18.0 |
| 19 | −20.007 | 13.33 | | |
| Image Plane | ∞ | | | |

| VARIOUS DATA ZOOM RATIO 1.00 | |
|---|---|
| Focal Length | 42.51 |
| Fno | 3.50 |
| Half Angle of View (°) | 6.51 |
| Image Height | 4.85 |
| Overall Lens Length | 91.32 |
| BF | 13.33 |

TABLE 1

| | NUMERICAL EXAMPLE | | | | |
|---|---|---|---|---|---|
| | 1 | 2 | 3 | 4 | 5 |
| Din | 10 | 12 | 12 | 10 | 35 |
| f | 7.85 | 7.85 | 12 | 19.10407 | 42.33487 |
| Fno | 4 | 3.9 | 8 | 4.5 | 3.5 |
| hgt | 4.85 | 4.85 | 4.85 | 4.85 | 4.85 |
| f1 | −38.9402 | −41.682 | −59.9851 | 453.4052 | 4422.247 |
| f2 | 15.99281 | 16.01418 | 23.1773 | 14.39492 | 40.63482 |
| L | 49.39873 | 49.26015 | 56.47019 | 34.6189 | 72.05863 |
| Lb | 32.5078 | 32.38115 | 41.27941 | 17.16067 | 60.74606 |
| Φ | 4.3 | 4.3 | 3.232233 | 3.088987 | 11.54988 |
| Inequality (1) | 0.809737 | 0.950058 | 1.700012 | 1.299868 | 1.700005 |
| Inequality (2) | 0.812695 | 0.691905 | 0.429994 | 0.381348 | 0.495886 |
| Inequality (3) | 0.43 | 0.358333 | 0.269353 | 0.308899 | 0.329997 |
| Inequality (4) | 0.404639 | 0.415015 | 0.309278 | 0.87533 | 2.493954 |
| Inequality (5) | 7.182867 | 7.56235 | 6.587493 | 6.603783 | 5.154593 |

Image Pickup Apparatus

Figure 12:
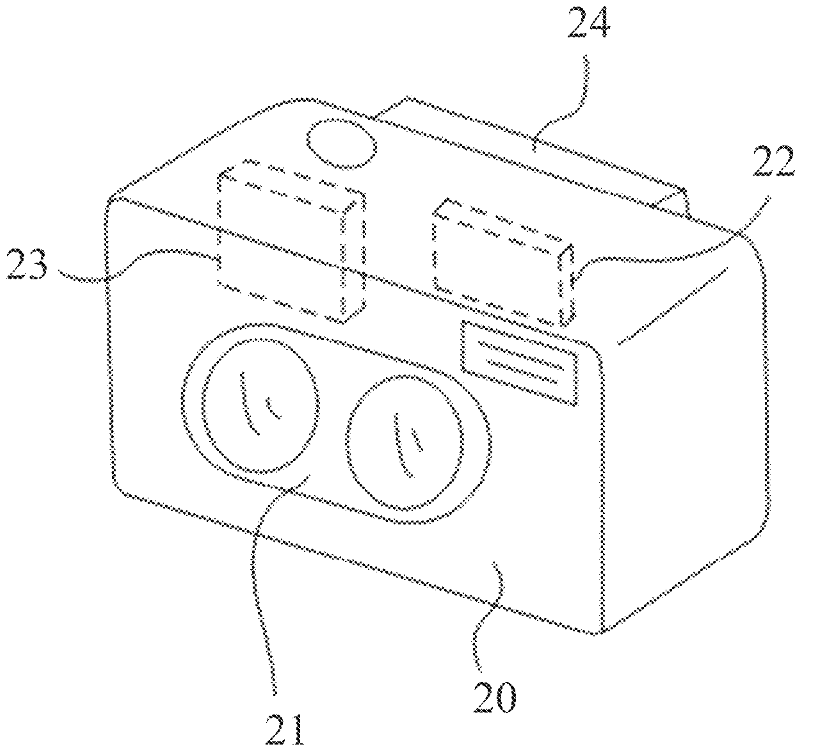
FIG. 12 illustrates an image pickup apparatus having the stereoscopic optical system according to any one of the above examples.

FIG. 12 illustrates a digital still camera as an image pickup apparatus that uses the stereoscopic optical system according to any one of the above examples as an imaging optical system. Reference numeral 20 denotes a camera body, reference numeral 21 denotes the imaging optical system including any one of the stereoscopic optical systems according to Examples 1 to 5, and integrated with the camera body 20. Reference numeral 22 denotes a single image sensor such as a CCD sensor or CMOS sensor that is built into the camera body 20 and configured to capture an optical image (object image) formed by the imaging optical system 21. Reference numeral 23 denotes a recorder configured to record image data generated by processing an imaging signal from the image sensor 22, and reference numeral 24 denotes a rear display configured to display the image data.

The stereoscopic optical system according to each example can provide a camera that has a reduced size, excellent stereoscopic viewability, and high optical performance.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can provide a stereoscopic optical system and a lens apparatus having the same, each of which can provide satisfactory stereoscopic viewing and high-quality images.

This application claims priority to Japanese Patent Application No. 2023-151614, which was filed on Sep. 19, 2023, and which is hereby incorporated by reference herein in its entirety.

What is claimed is:

1. A stereoscopic optical system comprising:

two optical systems arranged in parallel, wherein each of the two optical systems includes, in order from an object side to an image side, a front group, an aperture stop, and a rear group, wherein the following inequalities are satisfied:

$$0.00 < (Din/L) \times F \leq 1.35$$

$$4.4 \leq (f \times f1 + f \times f2 - f1 \times f2)/f^2 \leq 10.0$$

where L is a distance on an optical axis from a lens surface closest to an object in each of the two optical systems to an image plane, Din is a distance between the optical axes of lenses closest to the object in the two optical systems, F is an F-number of each of the two optical systems, f is a focal length of each of the two optical systems, f1 is a focal length of the front group in each of the two optical systems, and f2 is a focal length of the rear group in each of the two optical systems.

2. The stereoscopic optical system according to claim 1, wherein each of the two optical systems includes an aperture stop, and the following inequality is satisfied:

$$0.2 \leq \Phi/Din \leq 0.8$$

where Φ is a maximum aperture diameter of the aperture stop.

3. The stereoscopic optical system according to claim 1, wherein the following inequality is satisfied:

$$2 \leq (f/F)/hgt \leq 4.0$$

where hgt is a radius of an optical image formed on the image plane by each of the two optical systems.

4. The stereoscopic optical system according to claim 1, wherein each of the two optical systems is a coaxial optical system.

5. The stereoscopic optical system according to claim 1, wherein each of the two optical systems has two reflective surfaces configured to bend an optical path, and wherein a distance between the optical axes of lenses closest to the image plane in the two optical systems is shorter than the distance between the optical axes of the lenses closest to the object.

6. The stereoscopic optical system according to claim 1, wherein the two optical systems form optical images on an imaging surface of a single image sensor.

7. An image pickup apparatus comprising:

the stereoscopic optical system according to claim 1; and a single image sensor configured to perform imaging of an object through the stereoscopic optical system.

8. A stereoscopic optical system comprising:

two optical systems arranged in parallel, wherein each of the two optical systems includes, in order from an object side to an image side, a front group, an aperture stop, and a rear group, wherein the following inequalities are satisfied:

$$0.4 \leq (Lb/Din)/F \leq 1.5$$

$$4.4 \leq (f \times f1 + f \times f2 - f1 \times f2)/f^2 \leq 10.0$$

where Lb is a distance on an optical axis from the aperture stop to an image plane in each of the two optical systems, Din is a distance between optical axes of lenses closest to an object in the two optical systems, F is an F-number of each of the two optical systems, f is a focal length of each of the two optical systems, f1 is a focal length of the front group in each of the two optical systems, and f2 is a focal length of the rear group in each of the two optical systems.

9. The stereoscopic optical system as claimed in claim 8, wherein the following inequality is satisfied:

$$0.2 \leq \Phi/Din \leq 0.8$$

where Φ is a maximum aperture diameter of the aperture stop.

10. The stereoscopic optical system according to claim 8, wherein the following inequality is satisfied:

$$0.2 \leq (f/F)/hgt \leq 4.0$$

where f is a focal length of each of the two optical systems, and hgt is a radius of an optical image formed on the image plane by each of the two optical systems.

11. The stereoscopic optical system according to claim 8, wherein each of the two optical systems is a coaxial optical system.

12. The stereoscopic optical system according to claim 8, wherein each of the two optical systems has two reflective surfaces configured to bend an optical path, and wherein a distance between the optical axes of lenses closest to the image plane in the two optical systems is shorter than the distance between the optical axes of the lenses closest to the object.

13. A stereoscopic optical system according to claim 8, wherein the two optical systems form optical images on an imaging surface of a single image sensor.

14. An image pickup apparatus comprising:
the stereoscopic optical system according to claim 8; and
a single image sensor configured to perform imaging of an object through the stereoscopic optical system.

* * * * *